(12) United States Patent
Bouthemy (10) Patent No.: US 12,445,482 B2
(45) Date of Patent: Oct. 14, 2025

(54) SILENT VOICE OVER IP DENIAL OF SERVICE—REPETITIVE CALL SETUP AND HANG UP FROM AN ATTACKER

(71) Applicant: T-Mobile Innovations LLC, Overland Park, KS (US)

(72) Inventor: Jean-Luc Rene Bouthemy, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 405 days.

(21) Appl. No.: 17/736,741

(22) Filed: May 4, 2022

(65) Prior Publication Data

US 2023/0362190 A1   Nov. 9, 2023

(51) Int. Cl.
*H04L 9/40* (2022.01)
*H04L 65/1016* (2022.01)
*H04L 65/1104* (2022.01)
*H04M 3/436* (2006.01)

(52) U.S. Cl.
CPC ...... *H04L 63/1458* (2013.01); *H04L 65/1016* (2013.01); *H04L 65/1104* (2022.05); *H04M 3/436* (2013.01)

(58) Field of Classification Search
CPC ............. H04L 63/1458; H04L 65/1104; H04L 65/1016; H04M 3/436
See application file for complete search history.

(56) References Cited

U.S. PATENT DOCUMENTS

| | | | | |
|---|---|---|---|---|
| 8,914,406 B1 * | 12/2014 | Haugsnes | ........... | G06F 9/45558 710/316 |
| 2007/0121596 A1 * | 5/2007 | Kurapati | ............... | H04M 3/436 370/356 |
| 2010/0142382 A1 * | 6/2010 | Jungck | ................. | H04L 63/123 370/242 |

OTHER PUBLICATIONS

Lu et al., "Ghost Calls from Operational 4G Call Systems: IMS Vulnerability, Call DOS Attack, and Countermeasure", Proceedings of the 26th Annual International Conference on Mobile Computing and Networking, Sep. 21-25, 2020, 14 pages.

Wang et al., "Insecurity of Operational Cellular IoT Service: New Vulnerabilities, Attacks, and Countermeasures", Proceedings of the 27th Annual International Conference on Mobile Computing and Networking, Jan. 31-Feb. 4, 2022, 14 pages.

* cited by examiner

*Primary Examiner* — Paul E Callahan
(74) *Attorney, Agent, or Firm* — Shook, Hardy & Bacon L.L.P.

(57) ABSTRACT

Systems and methods for preventing a denial-of-service attack at a victim agent of a telecommunication network include a victim agent and a session management system communicatively coupled to the victim agent and an attacker agent. The session management system is to receive a call termination message during a session, determine whether the call termination message includes a first call termination message or a subsequent call termination message, determine that one or more call terminations are greater than or equal to a threshold, based on the one or more call terminations being greater than or equal to the threshold, determine an occurrence of a denial-of-service attack at the victim agent, and based on the occurrence of the denial-of-service attack, forward one or more calls associated with the victim agent during a period of time.

20 Claims, 5 Drawing Sheets

SILENT VOICE OVER IP DENIAL OF SERVICE—REPETITIVE CALL SETUP AND HANG UP FROM AN ATTACKER

SUMMARY

The present disclosure is directed, in part, to preventing one or more denial-of-service attacks at one or more victim devices of a telecommunication network, substantially as shown in and/or described in connection with at least one of the figures, and as set forth more completely in the claims.

In aspects set forth herein, a victim agent is connected to a telecommunication network. Typically, an attacker agent initiates, by the telecommunication network, a VoIP (Voice over IP or video call over IP) call to a victim agent. The attacker agent aborts the call in progress by sending a cancel message. The attacker agent sends a cancel message shortly after initiating the call. The victim agent becomes stuck such that the victim agent is unable to receive and make another call during call setup (the time between the call initiation to the call termination). However, here, a session management system receives a call termination message during a session, determines an occurrence of a denial-of-service attack at the one or more victim agents, and based on the occurrence of the denial-of-service attack determined, forwards one or more calls associated with the victim agent which permits the victim agent to make and receive calls during the attack.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for preventing one or more denial-of-service attacks at one or more victim devices of a telecommunication network. A call termination message is received during a session. Whether the call termination message comprises a first call termination message or a subsequent call termination message is determined. The subsequent call termination message comprises a call termination received after the first call termination message. One or more call terminations greater than or equal to a threshold is determined. An occurrence of a denial-of-service attack at the one or more victim agents is determined based on the one or more call terminations being greater than or equal to the threshold. Based on the occurrence of the denial-of-service attack determined, one or more calls associated with the one or more victim agents are forwarded during a period of time.

Advantageously, preventing a denial-of-service attack at one or more victim agents, provides the victim agent(s) the ability to place one or more calls during the denial-of-service attack(s).

In one aspect, a method is provided for preventing one or more denial-of-service attacks at one or more victim devices of a telecommunication network. The method includes receiving, by a session management system communicatively coupled to one or more attacker agents and one or more victim agents, a call termination message during a session. The method also includes determining whether the call termination message includes a first call termination message or a subsequent call termination message. The subsequent call termination message includes a call termination received after the first call termination message. The method further includes determining that one or more call terminations are greater than or equal to a threshold. The method further includes, based on the one or more call terminations being greater than or equal to the threshold, determining an occurrence of a denial-of-service attack at the one or more victim agents. The method further includes, based on the occurrence of the denial-of-service attack, forwarding one or more calls associated with the one or more victim agents during a period of time.

In another aspect, a computer-readable storage media having computer-executable instructions embodied thereon is provided that, when executed by one or more processors, cause the processors to perform various steps. The processors are caused to receive, by a session management system communicatively coupled to one or more attacker agents and one or more victim agents, a call termination message during a session. The processors are caused to determine whether the call termination message includes a first call termination message or a subsequent call termination message, wherein the subsequent call termination message includes a call termination received after the first call termination message. The processors are also caused to determine whether one or more call terminations are greater than or equal to a threshold. The processors are also caused to, based on the one or more call terminations being greater than or equal to the threshold, determine an occurrence of a denial-of-service attack at the one or more victim agents. The processors are also caused to, based on the occurrence of the denial-of-service attack, generate a denial-of-service attack notification, wherein the session management system is structured to provide the occurrence of the denial-of-service attack notification to the one or more victim agents.

In yet another aspect, a system is provided for preventing a denial-of-service attack at a victim agent of a telecommunication network. The system includes a victim agent and a session management system communicatively coupled to the victim agent and an attacker agent. The session management system receives a call termination message during a session. The session management system also determines whether the call termination message includes a first call termination message or a subsequent call termination message. The subsequent call termination message includes a call termination received after the first call termination message. The session management system further determines that one or more call terminations are greater than or equal to a threshold. The session management system further determines an occurrence of a denial-of-service attack at the victim agent based on the one or more call terminations being greater than or equal to the threshold. The session management system further forwards, based on the occurrence of the denial-of-service attack, one or more calls associated with the victim agent during a period of time.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and non-removable media, non-transitory and/or transitory media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

The terms "agent device," "user equipment," "UE," "attacker agent," "victim agent," and "user device" are used interchangeably to refer to a device employed by an end-user that communicates using a network. An agent device is a logical network endpoint that sends or receives Session Initiation Protocol (SIP) messages and/or manages SIP sessions. In some examples, an agent device may have client and/or server components. An agent device may be deployed in a networking device (e.g., a device connected to a fixed and/or mobile network) such as a UE, consumer device, Internet of Things (IoT) devices, etc. UE generally includes one or more antenna coupled to a radio for exchanging (e.g., transmitting and receiving) transmissions with a nearby base station, via an antenna array of the base station, and/or to Access Points if Wi-Fi and/or Wi-Li is available. In embodiments, the UE may take on any variety of devices, such as a personal computer, laptop computer, tablet, netbook, mobile phone, smart phone, personal digital assistant, wearable device, augmented reality device, fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using fixed and mobile networks (e.g., LTE, 5G, 6G, Wi-Fi, cable, satellite, etc.).

A "network" refers to a network comprised of wireless and wired components that provide wireless communications service coverage to one or more UE. The network may comprise an access network, core network(s), Voice over IP (VoIP) service, IP backbone, one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," "secondary," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
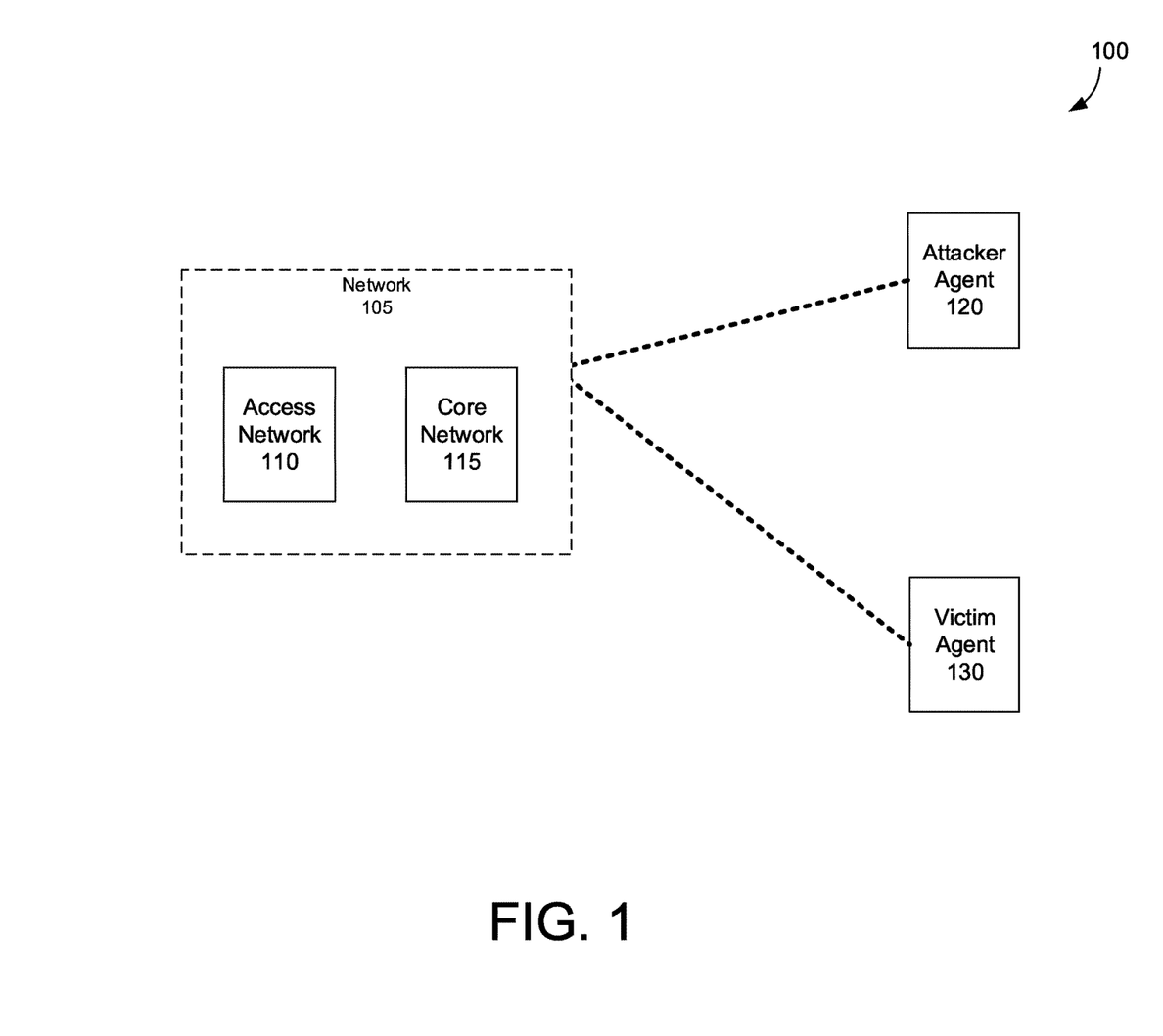
FIG. 1 depicts an example of a network environment in accordance with one or more embodiments.

The network environment 100 provides service to one or more devices (e.g., the attacker agent 120 and the victim agent130). In some embodiments, the network environment 100 may include a telecom network (e.g., a telecommunication network such as, but not limited to, a wireline, a satellite, and/or a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The network 105 (e.g., a telecommunication network) included in the network environment 100 includes an access network 110. The access network 110 may be a fixed or mobile network that may be terrestrial or non-terrestrial. The access network(s) provide IP connectivity to agents 120 and 130. The access network 110 may be connected to a core network 115. In embodiments that include a wireless network, the core network 115 (e.g., an Enhanced Packet Core in 4G network, Service Based Architecture in 5G network, etc.) may be connected to a session management system (e.g., IP Multimedia Subsystem) which may provide voice service delivery, multimedia service delivery, message service delivery, and/or any other suitable services.

In some embodiments, the network 105 included in the network environment 100 may include or otherwise may be accessible through a cell site. The cell site may include one or more antennas, base transmitter stations, radios, transmitter/receivers, digital signal processors, control electronics, GPS equipment, power cabinets or power supply, base stations, charging stations, etc. such that the cell site may provide a communication link between one or more user devices (e.g., one or more attacker agents and/or victim agents such as the devices 120 and 130) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone (NSA) mode. In the non-stand alone mode the network environment 100 may take the form of, for example, an E-UTRAN New Radio-Dual Connectivity (EN-DC) network. In an EN-DC network, an attacker agent and/or a victim agent may connect to or otherwise access a 4G, LTE, 5G, or any other suitable network simultaneously. In the stand alone mode, the telecom network may take the form of a 5G, 6G, or any other suitable network.

In some embodiments, the network environment 100 may include one or more nodes communicatively coupled to one or more attacker agents and one or more victim agents such that the node(s) may transmit to and receive requests and/or data from the attacker agent(s) and/or the victim agent(s). The one or more nodes may include a Next Generation Node B (e.g., gNodeB or gNB) or any other suitable node. The one or more nodes may correspond to one or more frequency bands within which the attacker agent(s) and/or the victim agent(s) may connect to the network environment such as, but not limited to, a telecommunication network or a portion thereof.

In some embodiments, the node(s) may be included within the cell site, external to the cell site, or otherwise communicatively coupled to the cell site. The node(s) may allocate radio frequency, or a portion thereof, to user device(s).

In some embodiments, the attacker agent(s) and/or the victim agent(s) may take the form of a wireless or mobile device capable of communication via the network environment 100. For example, the attacker agent 120 may take the form of a mobile device capable of communication via a telecom network such as, but not limited to, a wireless telecommunication network. In this regard, the attacker agent(s) and/or the victim agent(s) may be any computing device that communicates by way of a Transmission Control Protocol (TCP) network and/or Internet Protocol (IP) network, possibly relying on different access network technologies for example, a 4G, LTE, WiMAX, Wi-Fi, Wi-Li, 5G (5G SA and NSA), 6G, cable, satellite, or any other type of TCP/IP network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunication providers that provide IP services (e.g. for wireless operators LTE, 5G, 6G, voice, location, data, etc.) to one or more user devices. For example, the attacker agent 120 and/or the victim agent 130 may be subscribers to a telecommunication service provider, in which the devices are registered or subscribed to receive voice and data services (e.g., receive content that may be streamed, downloaded, etc.) over the network environment 100. The network environment 100 may include any communication network providing voice and/or data service(s) as an IP network. The access network 110 may be, for example, a Wi-Fi network, Wi-Li, 4G network (LTE, WiMAX, HSDPA), 5G network, 6G network, or a wireline network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2A:
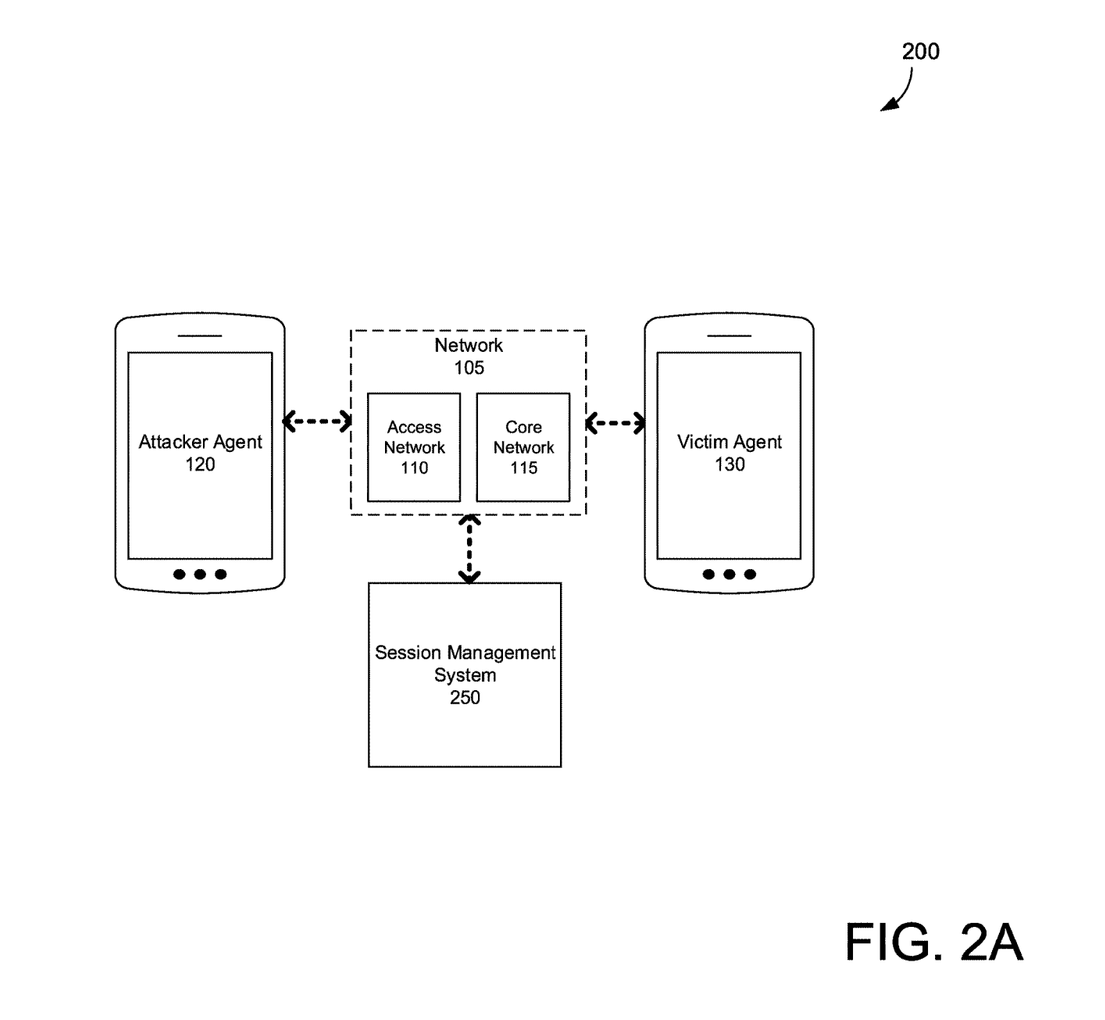
FIG. 2A is a diagram of a network environment including an attacker agent and a victim agent in accordance with an example embodiment.

FIG. 2A is a diagram of the network environment 200 (e.g., a telecommunication environment such as, but not limited to, a wireless telecommunication environment) according to an example embodiment. In the present embodiment, the network environment 200 includes the attacker agent 120, victim agent 130, and session management system 250. Although some of the components in the network environment 200 are depicted as single components (e.g., a single session management system, etc.), in some embodiments, the network environment 200 may include a plurality of such components.

Figure 2B:
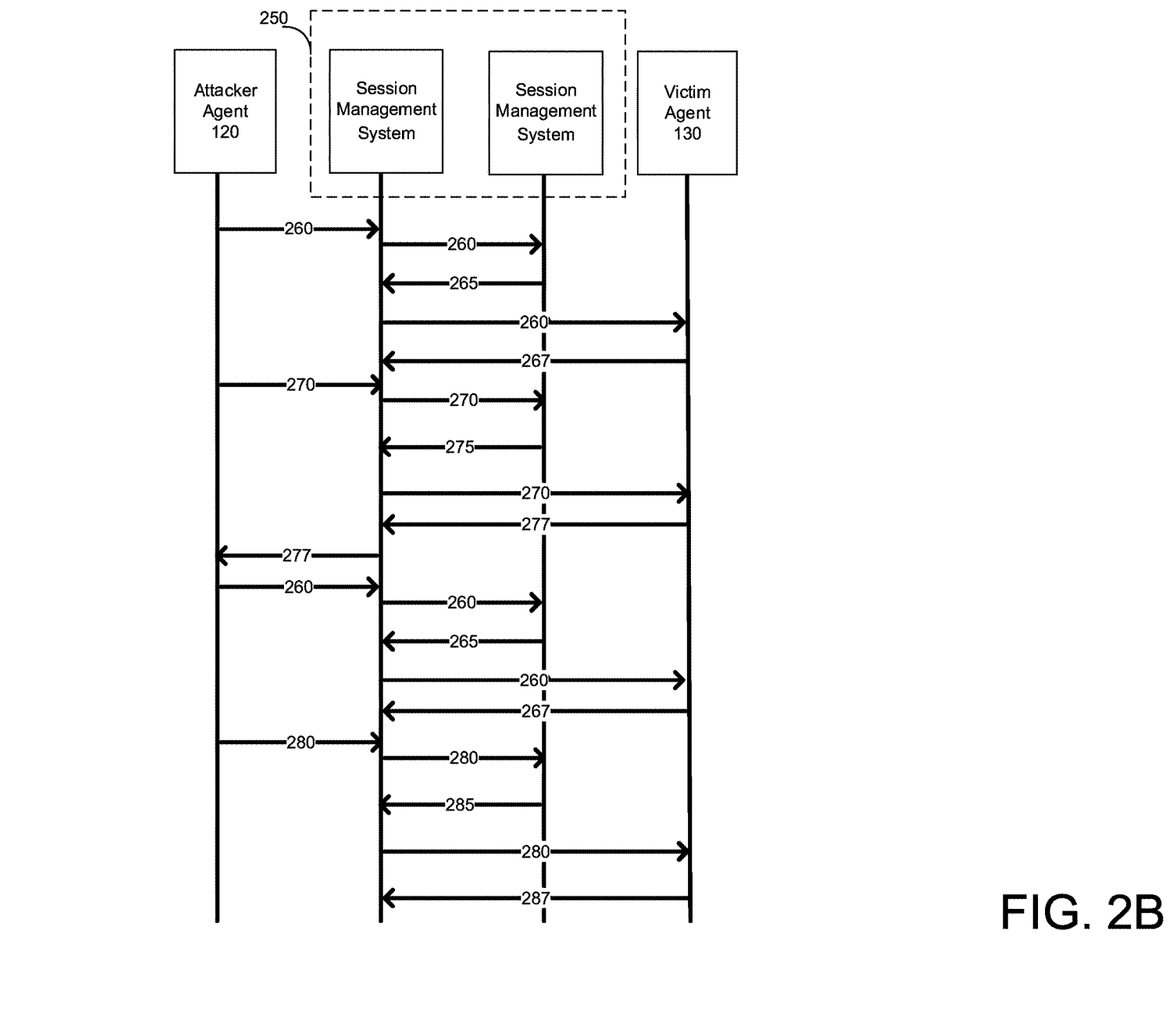
FIG. 2B is a diagram of a call setup in accordance with an example embodiment.

The session management system may include or may otherwise take the form of an IMS node (e.g., an IP Multimedia Subsystem node). For example the session management system may include a Session Border Controller (SBC), P-CSCF (Proxy-Call Session Control Function), I-CSCF (Interrogating Session Control Function), S-CSCF (Serving-Call Session Control Function), and/or TAS (Telephony Application Server). The P-CSCF may take the form of a SIP proxy. In some examples, the session management system may be communicatively coupled to one or more attacker agents and one or more victim agents. Various messages (e.g., the call invitation message 260 and 265 as shown in FIG. 2B) may be sent between the session management system and the victim agent(s) and/or the attacker agent(s) during the session. The session management system(s) may establish, modify, and tear down multimedia sessions.

In some embodiments, the session management system (e.g., the session management system 250) may receive a call termination message (e.g., a cancel message such as, but not limited to, a SIP CANCEL message 270 as shown in FIG. 2B, etc.) during a session. As used herein, the term "session" may be used to refer to at least one of a call setup, video setup, or messaging setup. The session may be based on a Session Initiation Protocol (SIP). The attacker agent 120 may provide the call termination message 270 to the session management system 250 during the session. In this regard for example, the session management system 250 may receive the SIP CANCEL message from the attacker agent 120 during the call setup. The session management system may provide the call termination message to the victim agent. For example, the session management system 250 may provide or otherwise transmit the SIP CANCEL message 270 to the victim agent 130.

In examples wherein the victim agent provides a call termination response message (e.g., a "200 OK CANCEL" message 277) to the session management system 250, the victim agent may be associated with a cancelled state. The cancelled state may indicate or otherwise may be associated with the receipt of the call termination message (e.g., a cancel message, SIP CANCEL message 270, etc.) from the attacker agent 120. The session management system 250 may provide the call termination response message 277 to the attacker agent 120.

In some embodiments, the session management system may determine whether the call termination message includes a first call termination message or a subsequent call termination message. For example, in response to the receipt of the call termination message (e.g., a cancel message, SIP CANCEL message 270, etc.) during the session (e.g., during the call setup), the session management system 250 may determine whether the call termination message includes the first call termination message (e.g., the first cancel message) received from the attacker agent 120 for provision to the victim agent 130. If the call termination message includes the first call termination message, the session management system may be structured to activate a timer. For example, the session management system 250 may trigger a new timer. In some embodiments, the timer may be operable according to a variable unit that identifies the quantity of cancellations that may be provided to the victim agent. In this regard, the session management system may initialize the variable unit.

The subsequent call termination message is or otherwise may include a call termination received after the first call termination message such that the subsequent call termination message may be associated with a plurality of call termination messages. For example, the attacker agent 120 may have provided two or more call termination messages 270, 280 to the session management system 250 for provision from the session management system 250 to the victim agent 130. If the call termination message includes a subsequent call termination message 280, the session management system 250 may be structured to increment the one or more call termination messages received. For example, the session management system 250 may increment the quantity of cancel messages received by incrementing the variable unit that identifies the quantity of cancellations received. Alternatively or additionally, if the call termination message includes the subsequent call termination message, a timer (e.g., a cancel timer) may be activated (e.g., the timer may be running).

In some examples, the session management system may determine that the call termination(s) are greater than or equal to a threshold. Based on the one or more call terminations being greater than or equal to the threshold, the session management system (e.g., the session management system 250) may determine an occurrence of a denial-of-service attack at the one or more victim agents. For example, if the number of SIP CANCEL messages 270, 280 received is equal to the threshold or greater than the threshold, the session management system may determine there has been an occurrence of a denial-of-service attack at the victim agent 130. The timer (e.g., the cancel timer) may be terminated (e.g., the timer may stop running). In examples wherein the timer is terminated, one or more variables (e.g., the variable unit or any other suitable variable) may be cleared.

Based on the occurrence of the denial-of-service attack determined, the session management system may forward the call(s) associated with the victim agent(s) during a period of time. For example, if the occurrence of the denial-of-service attack is determined (e.g., detected), the session management system 250 may forward calls for a brief period of time to provide the victim agent(s) 130 the ability to continue to place calls. Advantageously, the one or more victim agents may be structured to place one or more calls during the period of time. The victim agent(s) will not become stuck such that the victim agent(s) are still able to make and/or receive one or more calls.

Based on the occurrence of the denial-of-service attack determined, the session management system may generate an attack notification (e.g., a SMS message, text message, etc.). In this regard, if the occurrence of the denial-of-service attack is determined (e.g., detected), the session management system may generate and/or otherwise provide the attack notification to the victim agent(s). In turn, the attack notification may notify the user(s) of the victim agent(s) of the occurrence of the denial-of-service attack. The attack notification may include message data or video data (e.g., video signals and/or audio signals). In this regard, the victim agent (e.g., the victim agent 130) may include a device interface that may receive, via a message application, message box, etc., one or characters (e.g., numeric characters/alphabet characters), video signals, and/or audio signals that indicate the occurrence of the denial-of-service attack. The video data may be converted to digital bits. The digital bits may be compressed/coded and placed into packets. The packets may be transmitted, via the network 200, to the victim agent in real-time or near real-time. The packets may be decompressed/decoded and converted into video signals and/or audio signals.

The attack notification may be provided (e.g., provided by the session management system 250) or otherwise received by the victim agent during and/or after the occurrence of the denial-of-service attack. In some examples, the device interface(s) may be communicatively coupled to and/or operable via one or more APIs. The APIs may provide or otherwise transmit the message data and/or video data between the device interface(s) and/or the session management system.

Figure 3:
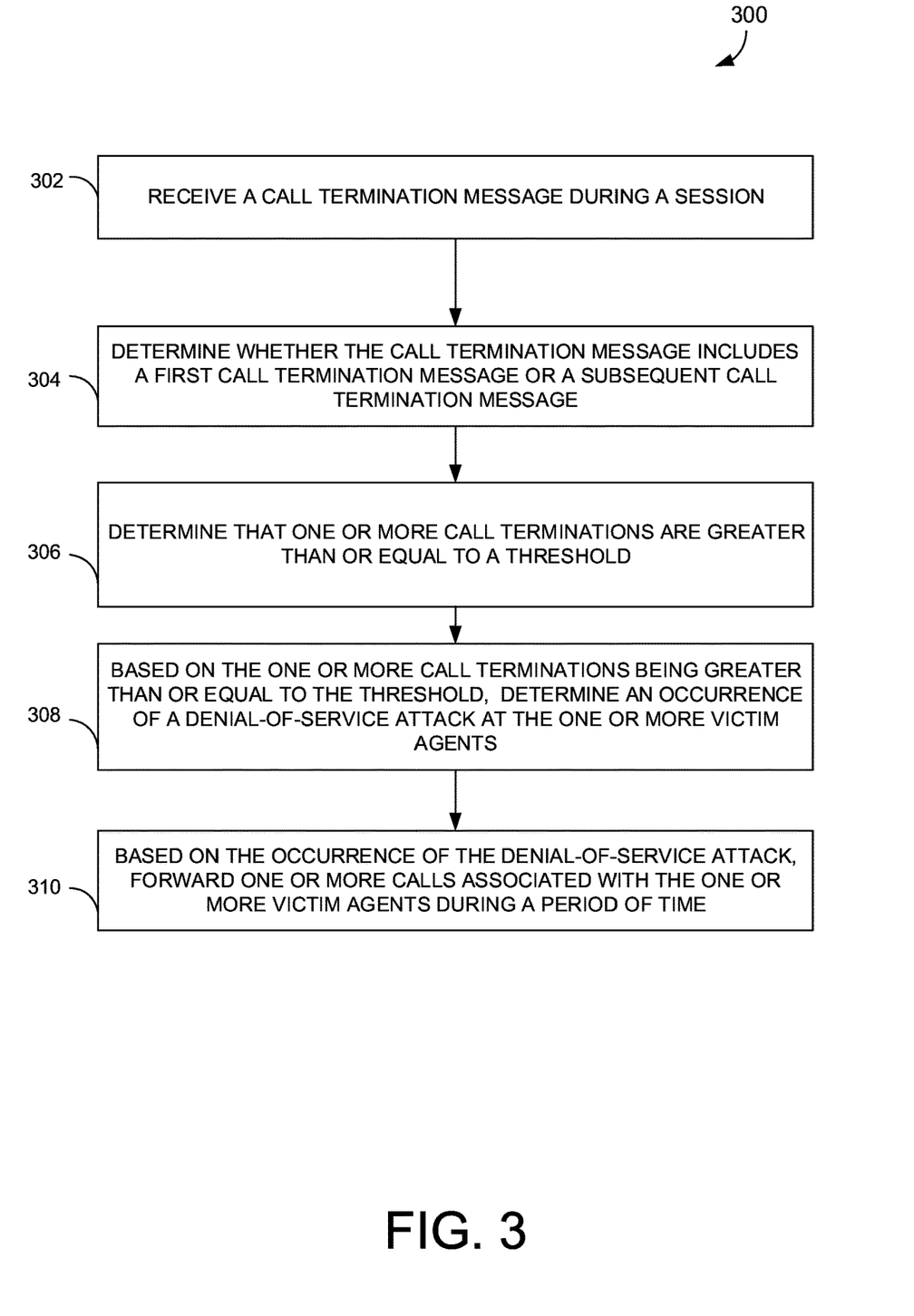
FIG. 3 depicts a flowchart of an exemplary method for preventing one or more denial-of-service attacks at one or more victim devices of a telecommunication network in accordance with an example embodiment.

FIG. 3 depicts a flow diagram of an exemplary method 300 for preventing a denial-of-service attack at a victim agent of a telecommunication network, in accordance with implementations of the present disclosure. Initially at block 302 a call termination message (e.g., a cancel message) is received by the session management system during a session (e.g., a call setup). At block 304, whether the call termination message includes a first call termination message or a subsequent call termination message is determined. For example, in response to receiving the call termination message during the session, the session management system may determine whether the call termination message includes a first call termination message (e.g., the first cancel message) from the attacker agent for provision to the victim agent. If the call termination message includes the first call termination message, the session management system may activate or otherwise trigger a timer. A variable unit of the timer may identify the quantity of cancellations that may be provided to the victim agent. In some embodiments, the attacker agent may provide two or more call termination messages to the session management system for provision from the session management system to the victim agent. If the call termination message includes the subsequent call termination message (e.g., a call termination received after the first call termination message), the session management system may increment the quantity of the call termination message(s) (e.g., cancellation messages) received by incrementing the variable unit. In some examples, if the call termination message includes or otherwise takes the form of the subsequent call termination message, a timer (e.g., a cancel timer) may be activated.

In some embodiments, that one or more call terminations are greater than or equal to a threshold is determined at block 306. Based on the one or more call terminations being greater than or equal to the threshold, the session management system (e.g., the session management system 250) may determine an occurrence of a denial-of-service attack at the one or more victim agents at block 308.

One or more calls associated with the one or more victim agents are forwarded during a period of time based on the occurrence of the denial-of-service attack determined at block 310. In some examples, if the occurrence of the denial-of-service attack is determined (e.g., detected), the session management system may forward calls for a brief period of time to provide the victim agent(s) the ability to continue to place calls. Alternatively or additionally, the session management system may generate an attack notification (e.g., a SMS message). The attack notification may be provided to the victim agent(s) to notify the user(s) of the victim agent(s) of the occurrence of the denial-of-service attack. The attack notification may include message data or video data (e.g., video signals). The attack notification may be output by a device interface of the victim agent, contact center application, dashboard, and/or any other suitable output device, system, and/or component.

Figure 4:
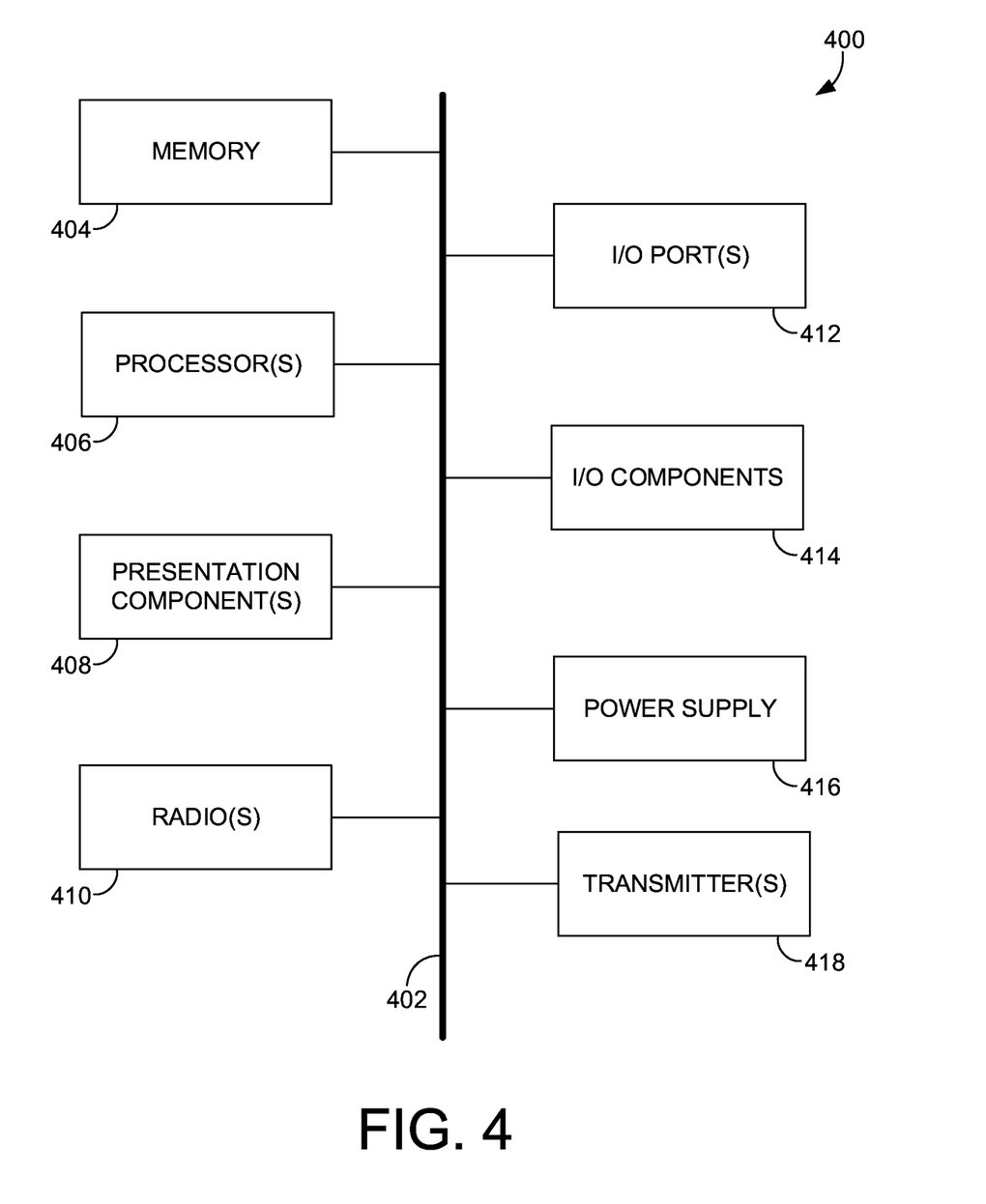
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, and/or transmitter(s) 418. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VoLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for preventing one or more denial-of-service attacks at one or more victim devices of a telecommunications network, the method comprising:
by a session management system communicatively coupled to one or more attacker agents and one or more victim agents;
receiving a call termination message during a session;
determining whether the call termination message comprises a first call termination message or a subsequent call termination message, wherein the subsequent call termination message comprises a call termination received after the first call termination message;
activating a timer if the call termination message comprises the first call termination message, wherein the timer comprises a variable unit;
determining that a number of call termination messages received by the session management system is greater than or equal to a threshold;
based on the number of call termination messages being greater than or equal to the threshold, determining an occurrence of a denial-of-service attack at the one or more victim agents; and
based on the occurrence of the denial-of-service attack, forwarding one or more calls associated with the one or more victim agents during a period of time.

2. The method of claim 1, wherein the one or more victim agents are structured to place calls during the period of time.

3. The method of claim 1, wherein the session comprises at least one of a call setup, video setup, or messaging setup, and wherein the session is based on a Session Initiation Protocol (SIP).

4. The method of claim 1, wherein the session associated with the one or more victim agents is associated with a cancelled state.

5. The method of claim 4 further comprising notifying in real-time or near real-time, one or more users of the one or more victim agents of the occurrence of the denial-of-service attack, wherein a notification to notify the one or more users comprises message data and/or video data, wherein a device interface of the one or more victim agents is configured to output the notification.

6. The method of claim 1, wherein the session management system is structured to increment a quantity of call termination messages if the call termination message comprises the subsequent call termination message.

7. The method of claim 1, wherein the telecommunications network comprises a cell site, and wherein the cell site is operable based on at least one of Voice over Long-Term Evolution (VoLTE), 5G New Radio network, Transmission Control Protocol (TCP) network, or Internet Protocol (IP) network.

8. The method of claim 1, wherein the session management system comprises an IP Multimedia Subsystem (IMS) node.

9. The method of claim 7, wherein the cell site comprises the session management system.

10. Computer-readable storage media having computer-executable instructions embodied thereon that, when executed by one or more processors, cause the one or more processors to:
receive, by a session management system communicatively coupled to one or more attacker agents and one or more victim agents, a call termination message during a session;
determine whether the call termination message comprises a first call termination message or a subsequent call termination message, wherein the subsequent call termination message comprises a call termination received after the first call termination message;
activate a timer if the call termination message comprises the first call termination message, wherein the timer comprises a variable unit;
determine that a number of call termination messages received by the session management system is greater than or equal to a threshold; and
based on the number of call termination messages being greater than or equal to the threshold, determine an occurrence of a denial-of-service attack at the one or more victim agents.

11. The computer-readable storage media of claim 10, wherein the one or more victim agents are structured to place one or more calls during a period of time.

12. The computer-readable storage media of claim 10, wherein the session comprises at least one of a call setup, video setup, or messaging setup, and wherein the session is based on a Session Initiation Protocol (SIP).

13. The computer-readable storage media of claim 10, wherein the session associated with the one or more victim agents is associated with a cancelled state.

14. The computer-readable storage media of claim 13, wherein based on the occurrence of the denial-of-service attack, the one or more processors are further configured to generate a denial-of-service attack notification, wherein the session management system is structured to provide the occurrence of the denial-of-service attack notification to the one or more victim agents in real-time or near real-time, wherein a device interface of the one or more victim agents is configured to output the denial-of-service attack notification to notify one or more users of the one or more victim agents.

15. The computer-readable storage media of claim 10, wherein the session management system is structured to increment the call termination if the call termination message comprises the subsequent call termination message.

16. The computer-readable storage media of claim 10, wherein the session management system comprises an IP Multimedia Subsystem (IMS) node.

17. A system for preventing a denial-of-service attack at a victim agent of a telecommunication network, the system comprising:
the victim agent; and
a session management system communicatively coupled to the victim agent and an attacker agent, the session management system structured to:
receive a call termination message during a session;
determine whether the call termination message comprises a first call termination message or a subsequent call termination message, wherein the subsequent call termination message comprises a call termination received after the first call termination message;
determine that a number of call termination messages received by the session management system is greater than or equal to a threshold;
based on the number of call termination messages being greater than or equal to the threshold, determine an occurrence of the denial-of-service attack at the victim agent;
notify in real-time or near real-time, a user of the victim agent, of the occurrence of the denial-of-service attack, wherein a notification to notify the user comprises message data and/or video data, wherein a device interface of the victim agent is configured to output the notification; and
based on the occurrence of the denial-of-service attack, forward one or more calls associated with the victim agent during a period of time.

18. The system of claim 17, wherein the victim agent is structured to place calls during the period of time.

19. The system of claim 17, wherein the session comprises at least one of a call setup, video setup, or messaging setup, and wherein the session is based on a Session Initiation Protocol (SIP).

20. The system of claim 17, wherein the session management system is structured to activate a timer if the call termination message comprises the first call termination message, and wherein the timer comprises a variable unit.

* * * * *